Patented July 8, 1952

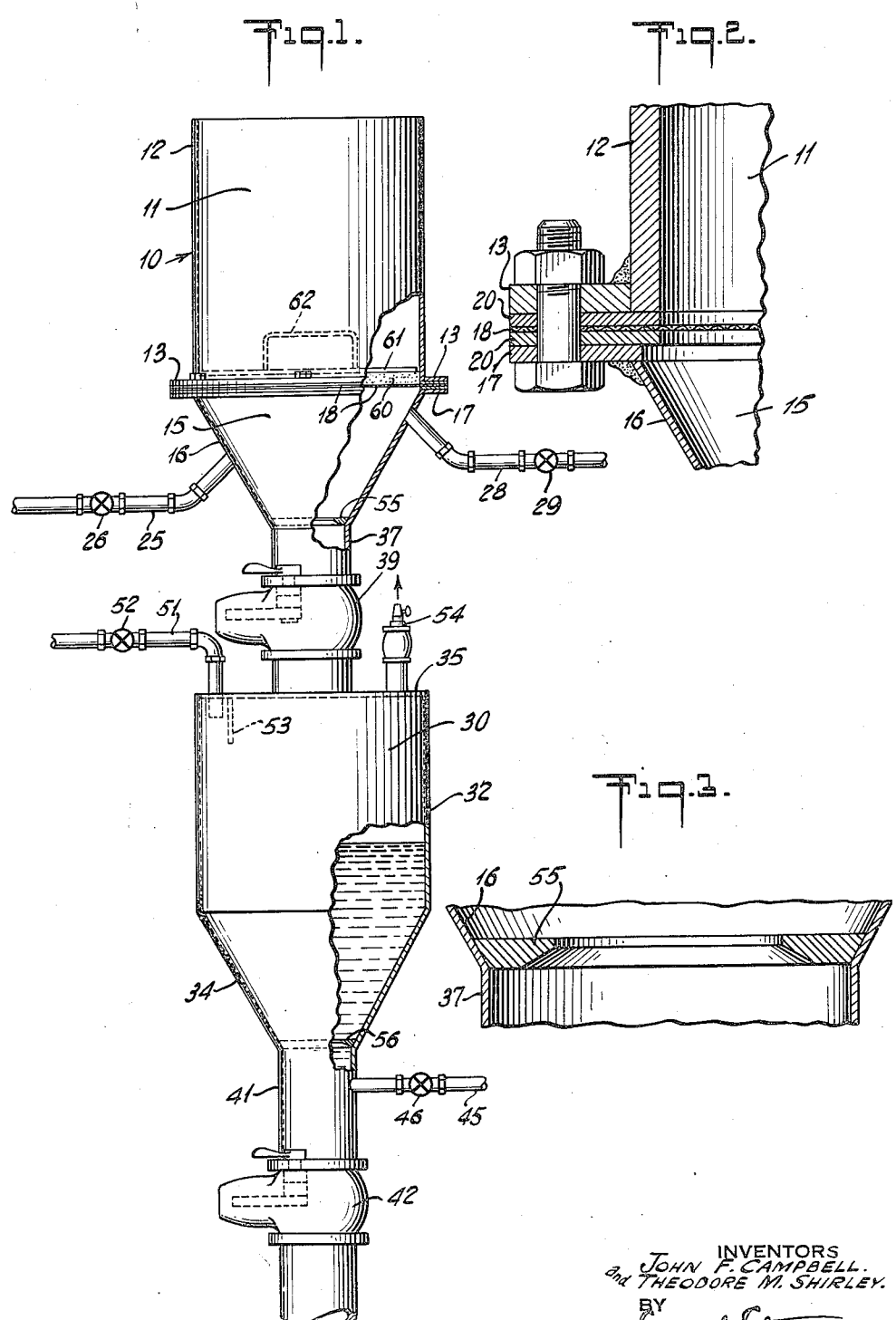

2,602,325

UNITED STATES PATENT OFFICE 2,602,325

PULP TESTING DEVICE

John F. Campbell and Theodore M. Shirley, Meridian, Miss., assignors to The Patent and Licensing Corporation, New York, N. Y., a corporation of Massachusetts Application December 31, 1947, Serial No. 795,028

2 Claims. (Cl. 73—63)

This invention relates to a device for testing pulps and aqueous suspensions thereof, and more particularly to a device for measuring the drainage characteristics of wood fiber pulps.

In the manufacture of fibrous felted webs by depositing an aqueous suspension of fiber pulp on a wire screen, as for example, in the Fourdrinier machine, the quality of the web produced and the speed of the web through the subsequent stages of the machine are affected to a large extent by the drainage characteristics or "freeness" of the pulp employed. Various types of pulps have widely different degrees of freeness; pulps used in the manufacture of wood fiber insulation boards, for example, have a much greater degree of freeness than have pulps used in the manufacture of paper. Pulp testing devices have been proposed and are in use for measuring the rate of free drainage of water from aqueous suspensions of paper pulps but these conventional devices have been found to be of little value for testing wood fiber insulation board pulps. Insulation board pulps are so "free" in comparison with paper pulps that significant differences in properties of different batches of insulation board pulps are difficult to detect in the conventional testers. Further, the measurement of the free flow of water from an aqueous suspension of wood fiber insulation board pulp is not by itself sufficient. Other factors relating to the drainage characteristics of the pulp must be determined before an accurate prediction of the behavior of the pulp on the board forming machine can be made.

A further disadvantage of conventional freeness testers is the fact that they are based on testing a very small quantity of pulp. This is not particularly disadvantageous in the case of paper pulps where the fibers are more or less uniform, but insulation board pulps generally include a quantity of relatively large fibers and others varying greatly in physical properties. This makes it difficult to obtain a representative specimen for testing in conventional freeness testers.

It is a principal object of this invention to provide a device for measuring the drainage characteristics of wood fiber insulation board pulps.

It is a further object of the invention to provide a device which will measure not only the rate of free drainage of water from aqueous suspensions of pulps but which will also measure other important factors relating to the drainage characteristics of the pulp.

It is a still further object of this invention to provide a device which will allow for the use of a test specimen sufficiently large to be representative of the batch of pulp being tested.

Other objects and features of the invention will be apparent from the detailed description which follows, and from the attached drawing, in which:

Fig. 1 is a view partly in elevation and partly in section of the device of the invention;

Fig. 2 is a view in section showing the manner in which a screen is secured to the upper chamber of the device; and Fig. 3 is a view in section showing the orifice plates embodied in the device.

Referring to the drawing, the numeral 10 designates generally the upper chamber of the device, comprising a cylindrical upper section 11 formed by a wall 12 having an outwardly extending flange 13 at the lower edge thereof and a lower frustoconical section 15 formed by a wall 16 having an outwardly extending flange 17 at the upper edge thereof. A horizontal screen 18 is interposed between section 11 and section 15 and is held in position between circular gasket rings 20 which are held, as by bolting, between flange 13 and flange 17. It will be observed that screen 18 may be readily removed and replaced by other screens. In this manner the chamber 10 may be provided with a screen of any desired mesh size. A water inlet line 25 having a valve 26 is provided in wall 16 and a compressed air inlet line 28 having a valve 29 is similarly provided in wall 16.

A lower chamber 30 is disposed below the upper chamber 10 and comprises an upper cylindrical section formed by a wall 32 and a lower frustoconical section formed by a wall 34 secured, as by welding, to wall 32. A top 35 is secured to the upper edge of wall 32. A passageway between chamber 10 and chamber 30 is provided by a pipe 37, the flow of liquid therethrough being regulated by a valve 39. A drain pipe 41 having a valve 42 is secured to the lower end of wall 34 and a draw-off line 45 having a valve 46 extends from the side of drain pipe 41. Valve 39 and valve 42 are quick-opening valves such as, for example, Lunkenheimer "handy" gate valves. A vacuum line 51, provided with a valve 52, extends into chamber 30 through top 35. Vacuum line 51 may be connected with any suitable vacuum inducing means such as a mechanical vacuum pump or a laboratory water ejector. A baffle 53 extending downwardly from top 35 adjacent the end of vacuum line 51 prevents liquids passing through pipe 37 from being drawn into the vacuum line. An air-release valve 54 for chamber 30 is provided in top 35.

In order to insure the free flow of water from the bottom of chamber 10, an orifice plate 55 having an orifice of predetermined diameter is inserted at the junction between wall 16 and the upper end of pipe 37. A similar orifice plate 56 is inserted in the lower end of chamber 30.

In using the device of the invention, the aqueous pulp suspension to be tested is poured into the upper chamber 10, the valve 39 being closed to prevent the suspension from passing into chamber 30. The suspension may be diluted to any required consistency by opening valve 26 and allowing water to enter chamber 10 through water inlet line 25. When the material is ready to be tested, valve 39 is opened and the liquid is discharged into chamber 30, the pulp being retained on screen 18 and forming a compact mat 60 thereon. At this time air-release valve 54 may be opened to prevent a back-pressure from developing in chamber 30. The free drainage of the pulp sample being tested may be determined by timing the flow of a given quantity of liquid from chamber 10 into chamber 30, or by measuring the quantity of water draining from the pulp suspension in a given length of time. In the latter case, the water is drawn off through pipe 45 into a suitable container, such as a graduate, where the quantity of water may be measured.

After the free drainage of the pulp has been determined as above described, other factors related to the drainage characteristic of the pulp may be measured. For example, a controlled vacuum may be applied through vacuum line 51 and the quantity of water drained from the pulp under the influence of the vacuum may be measured by drawing off the water through line 45.

The rate of drainage of water through the formed mat of the pulp may likewise be determined either before or after determining the drainage rate under induced vacuum. This test is conducted by closing valve 39, placing a circular screen 61, having a handle 62, on the pulp mat 60 lying on screen 18, and carefully adding water on top of screen 61. Valve 39 is then opened and the time required for the water to drain through the formed mat 60 may be measured.

If desired, further water may be removed from the mat 60 by application of vacuum as hereinabove described. After the pulp mat 60 on screen 18 has had as much of its contained water as possible removed by free drainage and/or by vacuum, it may be tested for water content by conventional methods. To remove the mat for that purpose from the screen 18, compressed air is admitted to chamber 10 through air line 28 by opening valve 29. The compressed air will force the mat to the top of chamber 10, from which it may be readily removed without rupture or further loss of water.

It will be obvious that various modifications and changes may be made without departing from the scope of the invention as defined in the appended claims and it is intended that the above description shall be interpreted in an illustrative and not in a limiting sense.

We claim:

1. A device for testing pulps and aqueous suspensions thereof, comprising an upper chamber having an upper cylindrical section with a flanged lower edge and a lower frusto-conical section with a flanged upper edge secured to said lower edge, a screen extending horizontally across said upper chamber and removably secured between the flanged edges of said upper cylindrical section and said lower frusto-conical section, a closed lower chamber, a passageway connecting the apex of said frusto-conical section with the top of said lower chamber, an orifice plate having an opening of predetermined size disposed at the juncture of said lower frusto-conical section and said passageway, and a quick-opening valve in said passageway whereby flow of liquid from said upper chamber to said lower chamber may be initiated instantaneously.

2. A device for testing pulps and aqueous suspensions thereof, comprising an upper chamber having an upper cylindrical section with a flanged lower edge and a lower frusto-conical section with a flanged upper edge secured to said lower edge, water inlet means and air inlet means in said frusto-conical section, a screen extending horizontally across said upper chamber and removably secured between the flanged edges of said upper cylindrical section and said lower frusto-conical section, a closed lower chamber, vacuum inducing means associated with said lower chamber, a passageway connecting the apex of said frusto-conical section with the top of said lower chamber, an orifice plate having an opening of predetermined size disposed at the juncture of said lower frusto-conical section and said passageway, and a quick-opening valve in said passageway whereby flow of liquid from said upper chamber to said lower chamber may be initiated instantaneously.

JOHN F. CAMPBELL.
THEODORE M. SHIRLEY.

REFERENCES CITED

The following references are of record in the file of this patent:

UNITED STATES PATENTS

| Number | Name | Date |
| --- | --- | --- |
| 1,139,825 | Vandercook | May 18, 1915 |
| 1,970,521 | Harvey | Aug. 14, 1934 |
| 2,346,945 | Samson et al. | Apr. 18, 1944 |

OTHER REFERENCES

Treadwell and Hall, "Analytical Chemistry," volume II, John Wiley & Sons, Inc., New York, N. Y., (1942), figure 8, page 30.

Cenco, Central Scientific Co. Calalog, 1700 Irving Park Road, Chicago, Illinois, (1941), page 247, funnel No. 15101.